(12) United States Patent
Baghel et al.

(10) Patent No.: US 11,564,070 B2
(45) Date of Patent: Jan. 24, 2023

(54) VEHICLE TO EVERYTHING (V2X) RADIO ACCESS TECHNOLOGY (RAT) FEATURE NEGOTIATION AND CONTROL

(71) Applicant: QUALCOMM Incorporated, San Diego, CA (US)

(72) Inventors: Sudhir Kumar Baghel, Hillsborough, NJ (US); Hong Cheng, Bridgewater, NJ (US); Michaela Vanderveen, Tracy, CA (US); Zhibin Wu, Bedminster, NJ (US); Kapil Gulati, Dover, DE (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/151,778

(22) Filed: Oct. 4, 2018

(65) Prior Publication Data
US 2019/0110178 A1 Apr. 11, 2019

Related U.S. Application Data

(60) Provisional application No. 62/569,286, filed on Oct. 6, 2017.

(51) Int. Cl.
*H04W 4/40* (2018.01)
*H04L 67/12* (2022.01)
(Continued)

(52) U.S. Cl.
CPC ............. *H04W 4/40* (2018.02); *H04L 67/12* (2013.01); *H04W 72/0446* (2013.01); *H04W 76/27* (2018.02)

(58) Field of Classification Search
CPC ... H04L 1/0003; H04L 1/0006; H04L 1/0025; H04W 4/04; H04W 4/046; H04W 4/40;
(Continued)

(56) References Cited

U.S. PATENT DOCUMENTS 10,433,242 B2 * 10/2019 Oh ..................... H04W 48/18
2019/0090107 A1 * 3/2019 Kim ..................... H04L 1/0025
(Continued)

FOREIGN PATENT DOCUMENTS

CN 105657777 A 6/2016
TW 201735699 A 10/2017
(Continued)

OTHER PUBLICATIONS

CATT: "Key Issue: RAT Selection for a V2X Application", 3GPP Draft; S2-174938_4500_V2X_KI_RAT_SEL_V1(LY)-QC-M_CLEAN_V1, 3rd Generation Partnership Project (3GPP), Mobile Competence Centre; 650, Route Des Lucioles; F-06921 Sophia-Antipolis Cedex; France, vol. SA WG2, No. Los Cabos, Mexico; Jun. 26, 2017-Jun. 30, 2017 Jun. 29, 2017 (Jun. 29, 2017), XP051303689, Retrieved from the Internet: URL:http://www.3gpp.org/ftp/Meetings_3GPP_SYNC/SA2/Docs/ [retrieved on Jun. 29, 2017], 2 pages.
(Continued)

*Primary Examiner* — Pao Sinkantarakorn
(74) *Attorney, Agent, or Firm* — Patterson + Sheridan, L.L.P.

(57) ABSTRACT

Certain aspects of the present disclosure are generally directed to vehicle techniques for selecting communication options for vehicle to everything (V2X) type communications. Certain aspects provide a method for wireless communication by a user-equipment (UE). The method generally includes receiving one or more parameters for selection of one or more features associated with one or more radio-access technology (RATs), and selecting the one or more features to be used for communicating with one or more other UEs using a V2X communication protocol. The selection of the one or more features may be based on the one or more parameters. The method may also include communi-
(Continued)

cating with the one or more other UEs via the selected one or more features.

21 Claims, 10 Drawing Sheets

(51) Int. Cl.
*H04W 76/27* (2018.01)
*H04W 72/04* (2009.01)

(58) Field of Classification Search
CPC ........... H04W 4/42; H04W 4/44; H04W 4/46; H04W 48/18
See application file for complete search history.

(56) References Cited

U.S. PATENT DOCUMENTS

| | | | | |
|---|---|---|---|---|
| 2019/0150082 | A1* | 5/2019 | Kedalagudde | H04W 48/18 370/329 |
| 2020/0136746 | A1* | 4/2020 | Li | H04L 1/0003 |

FOREIGN PATENT DOCUMENTS

| | | |
|---|---|---|
| WO | 2016200137 A1 | 12/2016 |
| WO | 2017081491 A1 | 5/2017 |
| WO | 2017136627 A1 | 8/2017 |
| WO | 2017149510 A1 | 9/2017 |

OTHER PUBLICATIONS

Huawei et al., "Discussion on the Tx carrier selection for PC5 CA", 3GPP Draft; R2-1710085 Discussion on the TX Carrier Selection for PC5 CA, 3rd Generation Partnership Project (3GPP), Mobile Competence Centre; 650, Route Des Lucioles; F-06921 Sophia-Antipolis Cedex; France, vol. RAN WG2, No. Prague, Czech Republic; Oct. 9, 2017-Oct. 13, 2017 Sep. 28, 2017 (Sep. 28, 2017), XP051354196, Retrieved from the Internet: URL:http://www.3gpp.org/ftp/tsg_ran/WG2_RL2/TSGR2_99bis/Docs/ [retrieved on Sep. 28, 2017], 6 pages.

Huawei et al., "On UEs with limited Rx capability in PC5 CA", 3GPP Draft; R2-1710086 on UEs with limited Rx capability in PC5 CA, 3rd Generation Partnership Project (3GPP), Mobile Competence Centre; 650, Route Des Lucioles; F-06921 Sophia-Antipolis Cedex; France, vol. RAN WG2, No. Prague, Czech Republic; Oct. 9, 2017-Oct. 13, 2017 Sep. 28, 2017, XP051354197, Retrieved from the Internet: URL:http://www.3gpp.org/ftp/tsg_ran/WG2_RL2/TSGR2_99bis/Docs/ [retrieved on Sep. 28, 2017], 4 pages.

International Search Report and Written Opinion—PCT/US2018/054549—ISA/EPO—dated Jan. 4, 2019.

Taiwan Search Report—TW107135191—TIPO—dated Oct. 26, 2021.

* cited by examiner

1100

| PSID | PPPP (Priority) | RAT to use | Carrier frequency set | Features |
|---|---|---|---|---|
| 0xF1 | PPPP1 | R14 (e.g.) | {f1, f2} | - |
| 0xF2 | PPPP2 | R15 (e.g.) | {f2, f3} | 64QAM |
| 0xF3 | PPPP2 | R15 (e.g.) | {f2, f3} | 64QAM, TxD |

| Bearer | RAT to use | Carrier frequency set | Features |
|---|---|---|---|
| 1 (default) | R14 (e.g.) | {f1, f2} | - |
| 2 | R15 (e.g.) | {f2, f3} | 64QAM |
| 3 | R15 (e.g.) | {f2, f3} | 64QAM, TxD |

| Bearer | PPPP (Priority) | RAT to use | Carrier frequency set | Priority of carriers within the set |
|---|---|---|---|---|
| 1 (default) | PPPP1 | R14 (e.g.) | {f1, f2} | (1, 2) |
| 2 | PPPP2 | R15 (e.g.) | {f2, f3} | (1, 2) |
| 3 | PPPP2 | R15 (e.g.) | {f2, f3} | (1, 2) |

FIG. 13

VEHICLE TO EVERYTHING (V2X) RADIO ACCESS TECHNOLOGY (RAT) FEATURE NEGOTIATION AND CONTROL

CROSS-REFERENCE TO RELATED APPLICATIONS

This application claims benefit of U.S. Provisional Patent Application Ser. No. 62/569,286 filed Oct. 6, 2017 which is expressly incorporated herein by reference in its entirety.

FIELD OF THE DISCLOSURE

Certain aspects of the present disclosure generally relate to wireless communications and, more particularly, to a vehicle-to-everything (V2X) communications systems.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation. Vehicle to everything (V2X) communications seek to enable vehicles to communicate with one another to provide a host of services, including vehicle to vehicle communications (V2V), vehicle to infrastructure (V2I) communications, vehicle to grid (V2G) communications and vehicle to people (V2P) communications.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure are generally directed to vehicle techniques for selecting communication options for vehicle to everything (V2X) type communications.

Certain aspects provide a method for wireless communication by a user-equipment (UE). The method generally includes receiving one or more parameters for selection of one or more features associated with one or more radio-access technologies (RATs), selecting the one or more features to be used for communicating with one or more other UEs using a V2X communication protocol, wherein the selection is based on the one or more parameters, and communicating with the one or more other UEs via the selected one or more features.

Certain aspects provide an apparatus for wireless communication. The apparatus generally includes a transceiver configured to receive one or more parameters for selection of one or more features associated with one or more RATs, and a processing system configured to select the one or more features to be used for communicating with one or more other UEs using a V2X communication protocol, wherein the selection is based on the one or more parameters, wherein the transceiver is configured to communicate with the one or more other UEs via the selected one or more features.

Certain aspects provide a computer readable medium having instructions stored thereon for receiving one or more parameters for selection of one or more features associated with one or more RATs, selecting the one or more features to be used for communicating with one or more other UEs using a V2X communication protocol, wherein the selection is based on the one or more parameters, and communicating with the one or more other UEs via the selected one or more features.

Certain aspects provide an apparatus for wireless communication. The apparatus generally includes means for receiving one or more parameters for selection of one or more features associated with one or more RATs, means for selecting the one or more features to be used for communicating with one or more other UEs using a V2X communication protocol, wherein the means for selecting the one or more features is based on the one or more parameters, and means for communicating with the one or more other UEs via the selected one or more features.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 11 is a table illustrating example mapping between provider service identifier (PSID) and radio access technology (RAT), in accordance with certain aspects of the present disclosure.

FIG. 12 is table illustrating example bearer binding parameters for selection of communication features, in accordance with certain aspects of the present disclosure.

FIG. 13 is a table illustrating example bearer binding information used by an upper layer of a wireless device for selection of communication features, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
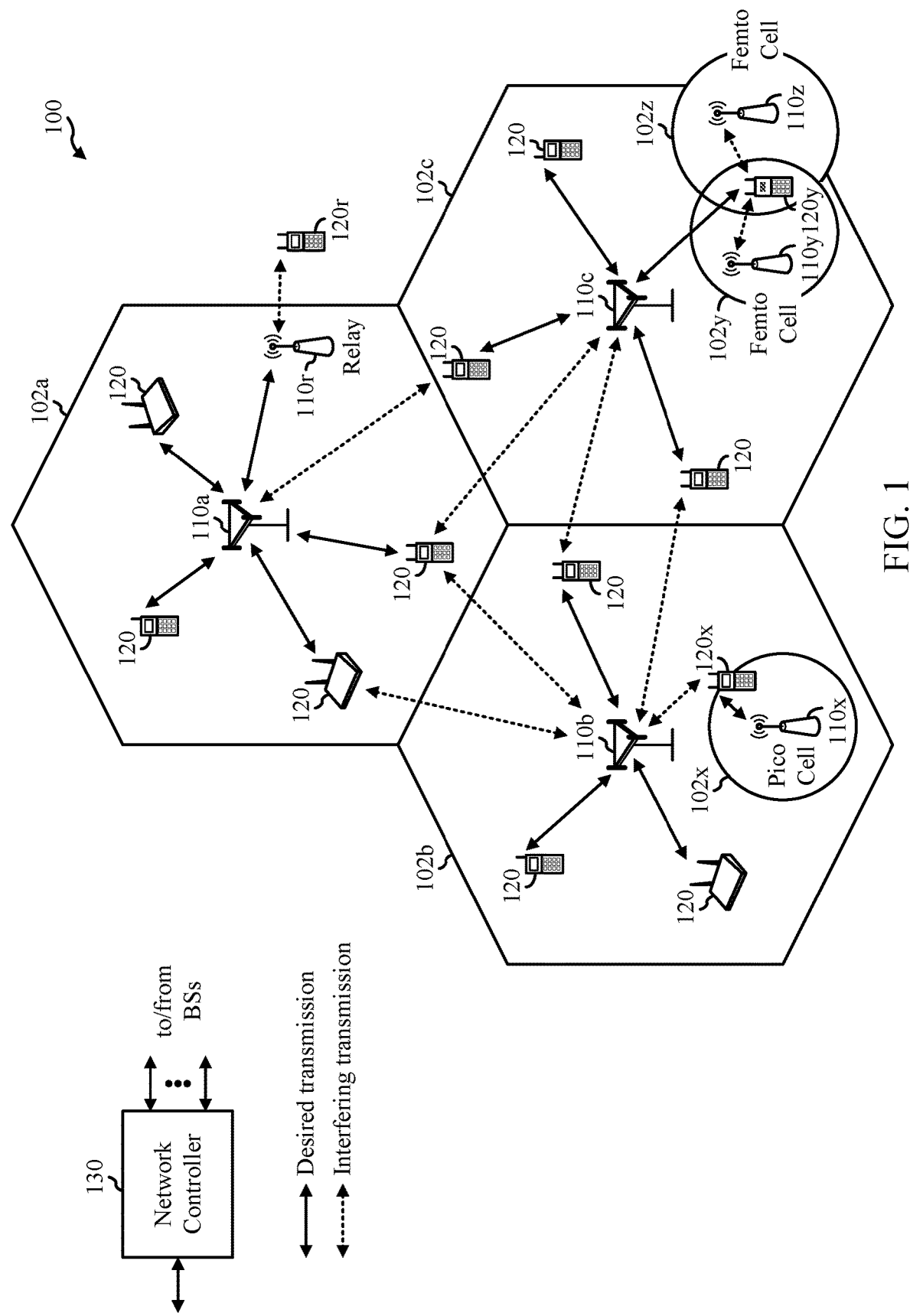
FIG. 1 is a block diagram conceptually illustrating an example telecommunications system, in accordance with certain aspects of the present disclosure.

Aspects of the present disclosure provide apparatus, methods, processing systems, and computer readable mediums for determining radio-access technology (RAT) for communication using vehicle-to-everything communications systems. Vehicle-to-everything (V2X) has been developed as a technology to address vehicular wireless communications to enhance road safety and the driving experience.

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless network may be a new radio (NR) or 5G network. NR wireless communication systems may employ short uplink bursts.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile BS. In some examples, the base stations may be interconnected to one another and/or to one or more other BSs or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.8 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using time division duplexing (TDD). A single component carrier (CC) bandwidth of 100 MHz may be supported. NR resource blocks may span 12 subcarriers with a subcarrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
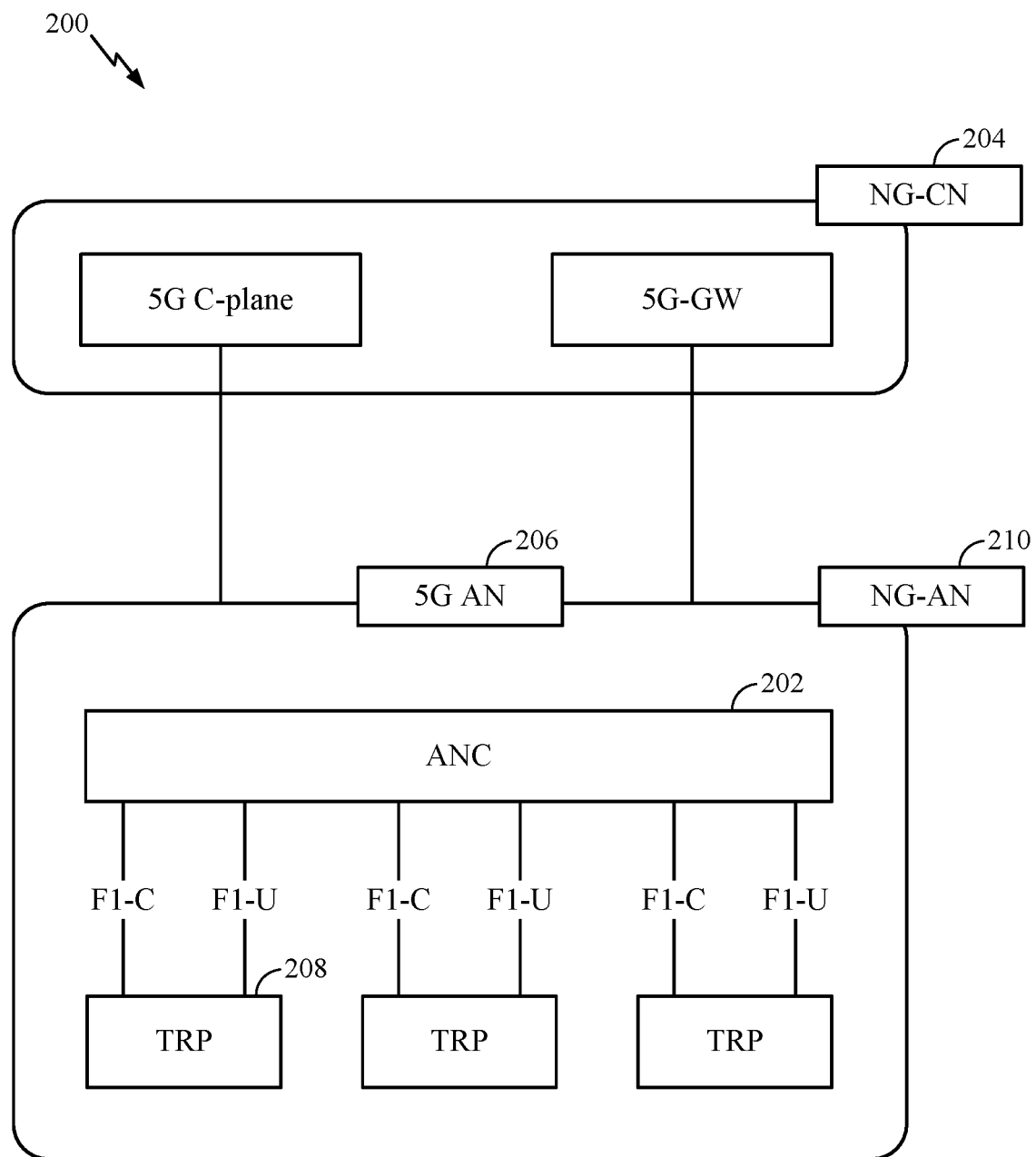
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture 200 may be used to illustrate fronthaul definition. The logical architecture 200 may support fronthauling solutions across different deployment types. For example, the logical architecture 200 may be based on transmit network capabilities (e.g., bandwidth, latency, and/or jitter).

The logical architecture 200 may share features and/or components with LTE. The next generation AN (NG-AN) 210 may support dual connectivity with NR. The NG-AN 210 may share a common fronthaul for LTE and NR.

The logical architecture 200 may enable cooperation between and among TRPs 208. For example, cooperation may be preset within a TRP and/or across TRPs via the ANC 202. There may be no inter-TRP interface.

Logical architecture 200 may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
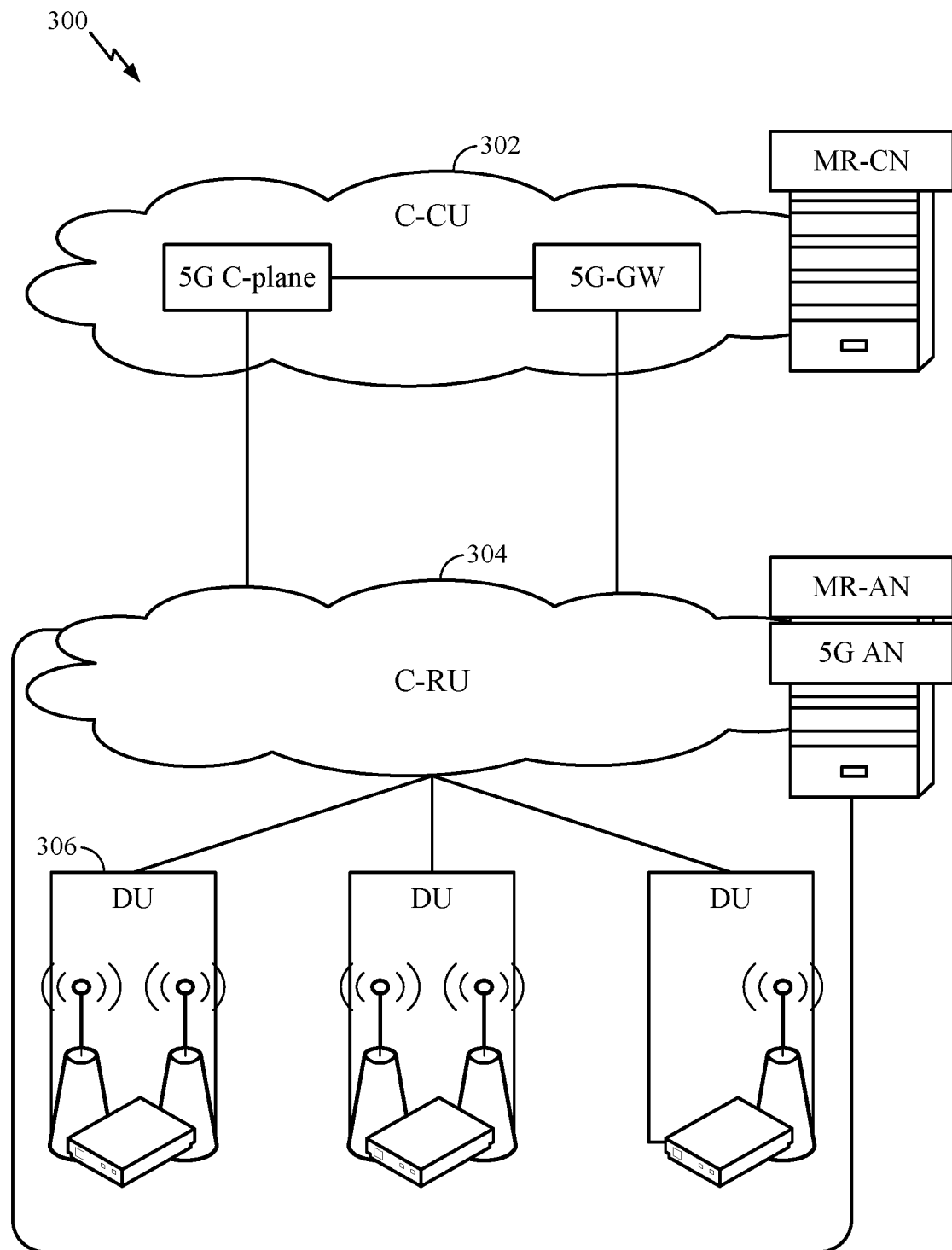
FIG. 3 is a diagram illustrating an example physical architecture of a distributed RAN, in accordance with certain aspects of the present disclosure.

FIG. 3 illustrates an example physical architecture 300 of a distributed RAN, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
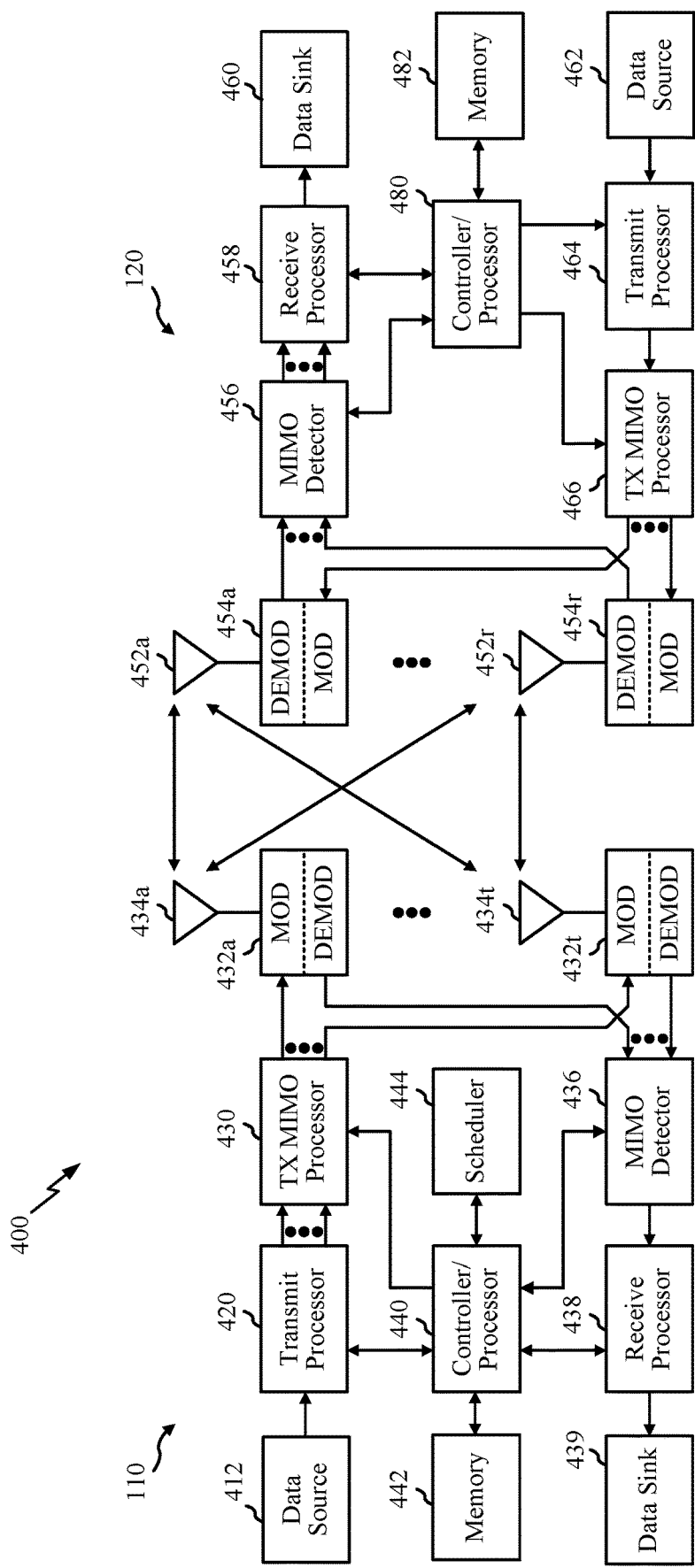
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). Master BS and the Secondary BS may be geographically co-located.

FIG. 4 shows a block diagram 400 of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The memories 442 and 482 may store data and program codes for the BS 110 and the UE 120, respectively. A scheduler 444 may schedule UEs for data transmission on the downlink and/or uplink.

Figure 5:
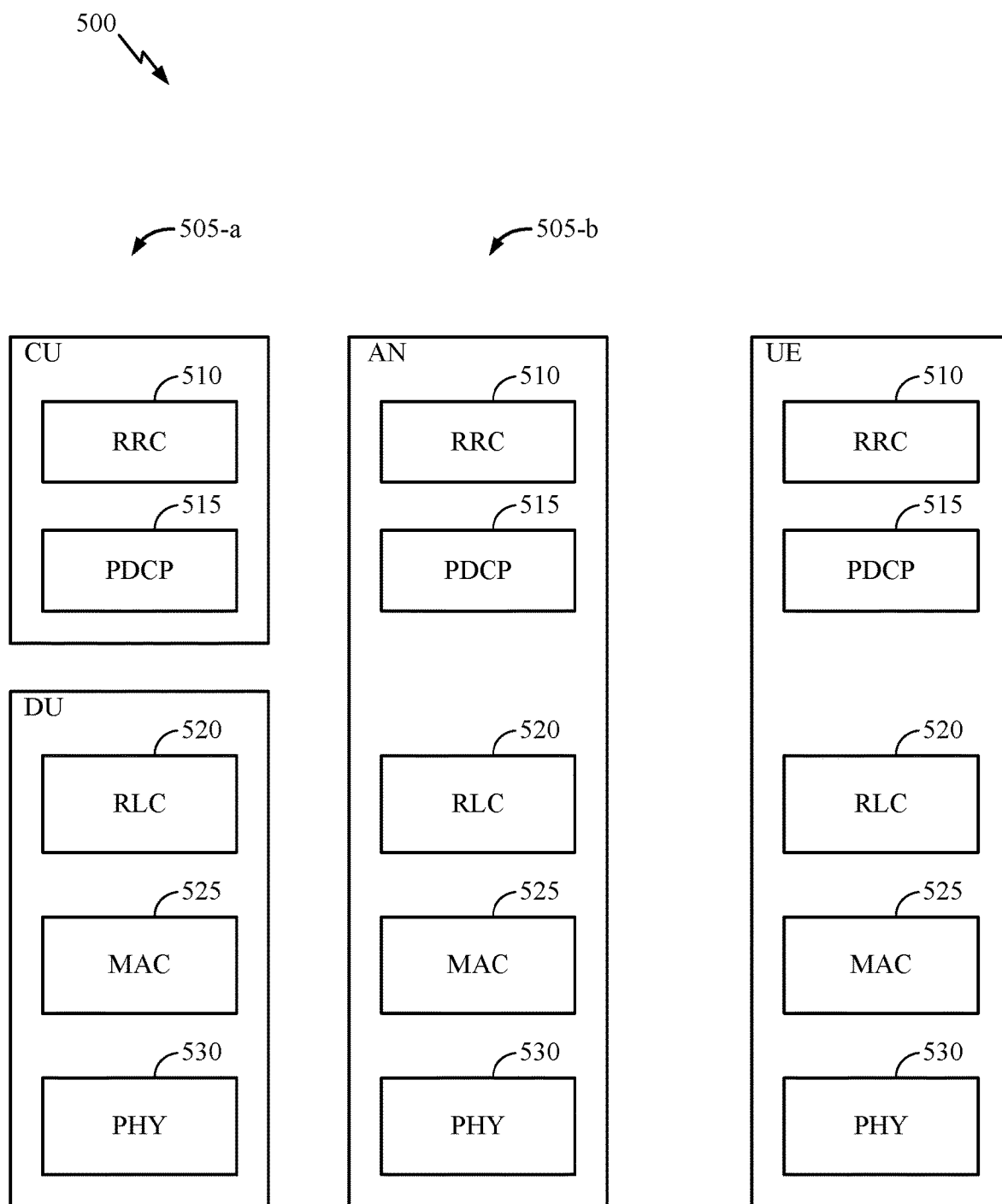
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
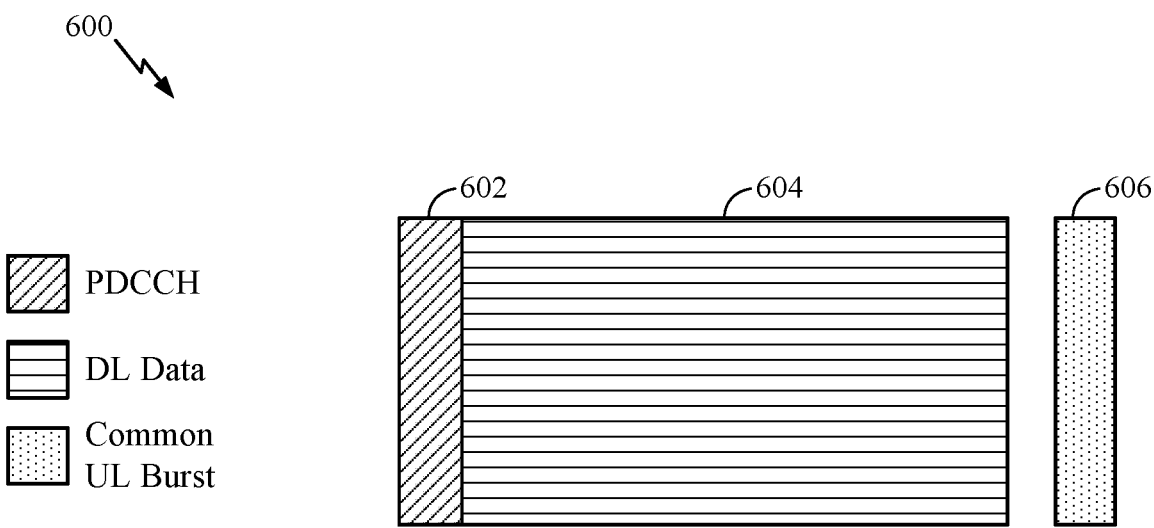
FIG. 6 illustrates an example of a DL-centric subframe, in accordance with certain aspects of the present disclosure.

FIG. 6 is a diagram showing an example of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
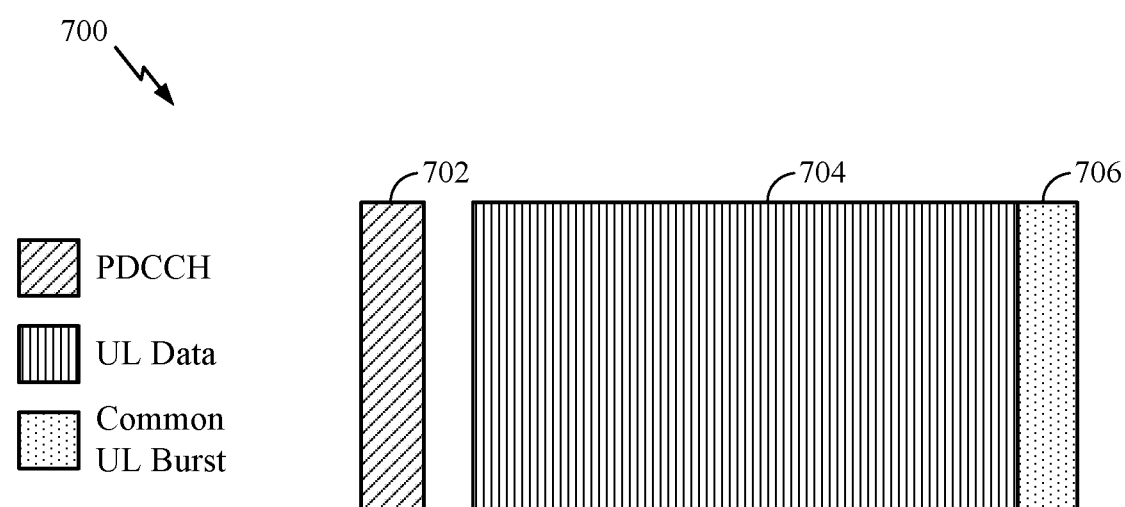
FIG. 7 illustrates an example of an UL-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe. The control portion 702 in FIG. 7 may be similar to the control portion described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 14:
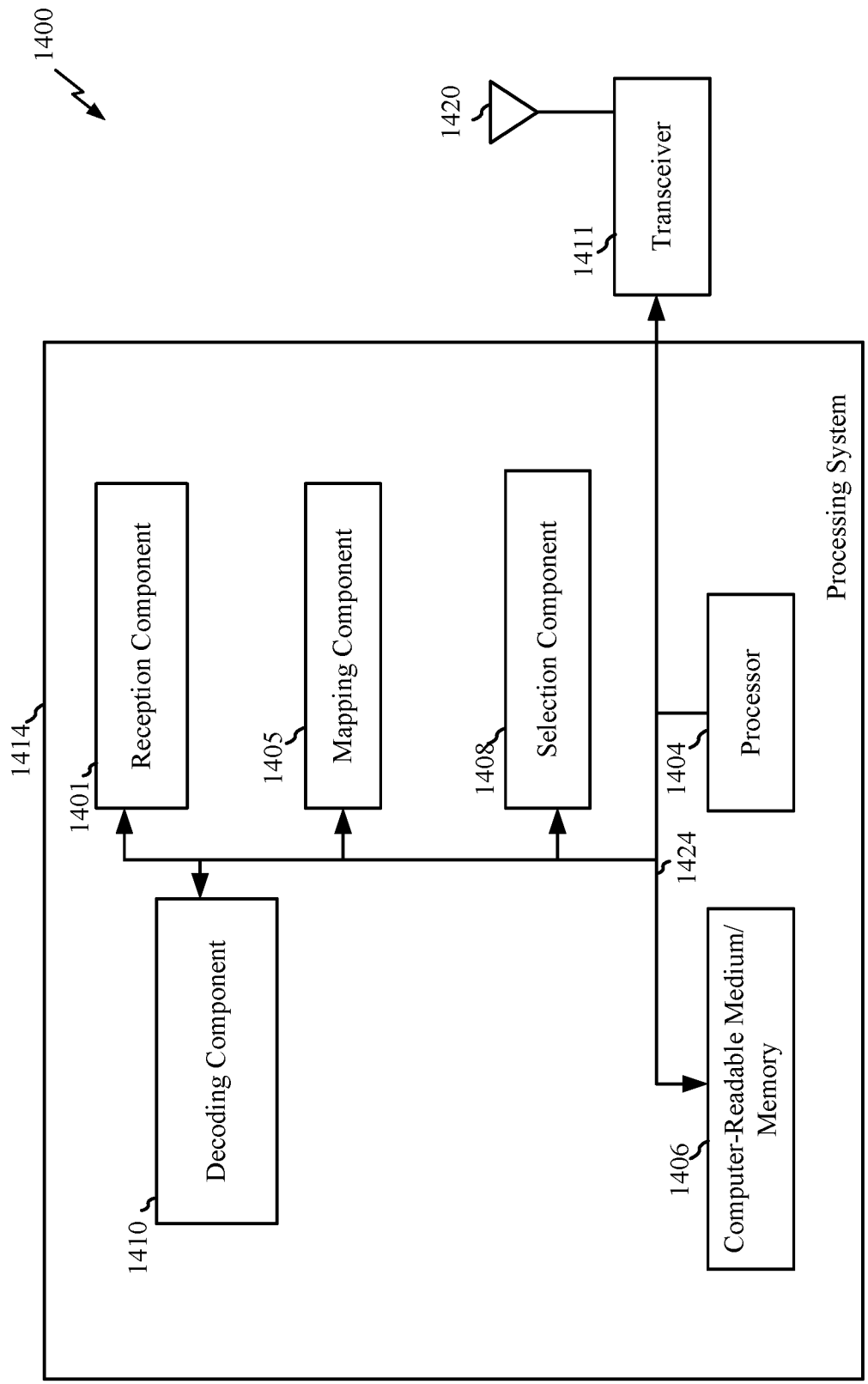
FIG. 14 illustrates an example wireless device, in accordance with certain aspects of the present disclosure.

FIG. 14 illustrates various components that may be used in a wireless device 1400 that may be employed to carry out operations and aspects described herein. For example, the wireless device 1400 may implement operations 1000 of FIG. 10.

The wireless device 1400 may include a processing system 1414 coupled to a transceiver 1411 for communication via an antenna 1420. The processing system may include a processor 1404 which controls operation of the wireless device 1400. The processor 1404 may also be referred to as a central processing unit (CPU). Memory 1406 (e.g., computer-readable medium), which may include both read-only memory (ROM) and random access memory (RAM), provides instructions and data to the processor 1404. A portion of the memory 1406 may also include non-volatile random access memory (NVRAM). The processor 1404 may perform logical and arithmetic operations based on program instructions stored within the memory 1406. The instructions in the memory 1406 may be executable to implement the methods described herein.

The processing system 1414 may include one or more other components used implement the methods and aspects described herein. For example, the processor 1404 may be coupled to a selection component 1408 for selection of communication options (e.g., radio access technology (RAT)), a decoding component 1410 for decoding of received messages, a mapping component (e.g., for mapping of a packet to a bearer), and a reception component 1401 for reception of one or more packets (e.g., from an application layer of the UE), as will be described in more detail herein. The various components of the wireless device 1400 may be coupled together by a bus system 1424, which may include a power bus, a control signal bus, and a status signal bus in addition to a data bus.

LTE vehicle-to-everything (LTE-V2X) has been developed as a technology to address vehicular wireless communications to enhance road safety and the driving experience.

Figure 9:
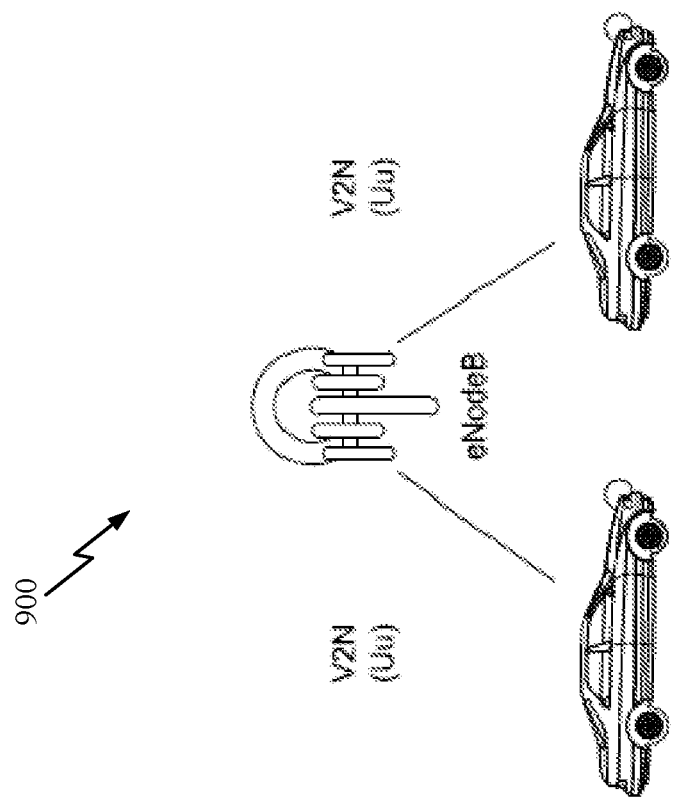
FIGS. 8 and 9 illustrate example vehicle to everything (V2X) communication systems, in accordance with certain aspects of the present disclosure.
Figure 8:
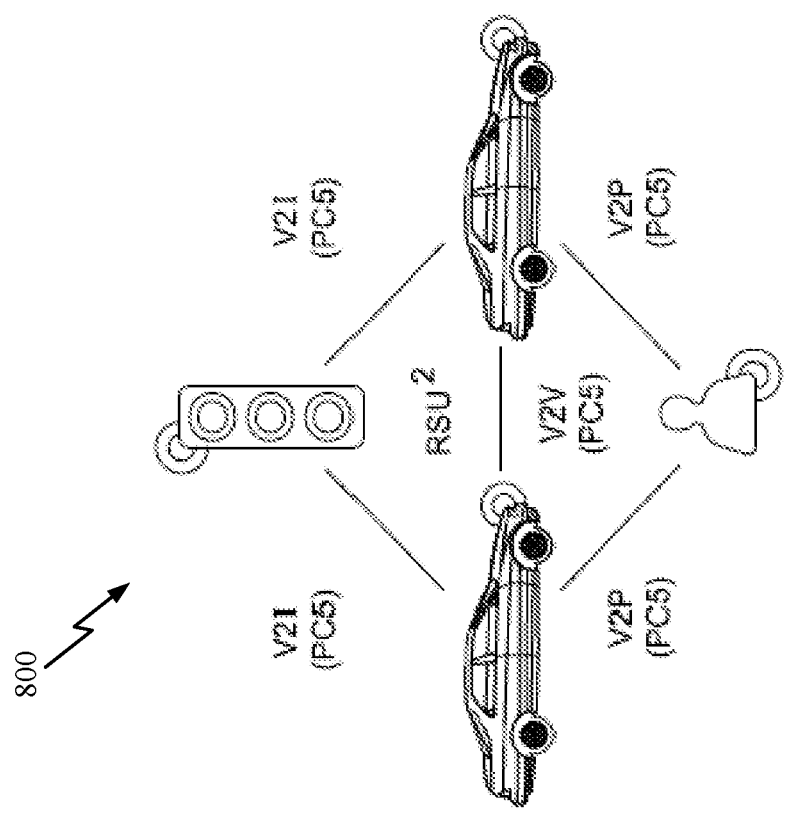

Referring to FIG. 8, a V2X system 800 is illustrated with two vehicles. The V2X system, provided in FIGS. 8 and 9 provides two complementary transmission modes. A first transmission mode involves direct communications between participants in the local area. Such communications are illustrated in FIG. 8. A second transmission mode involves network communications through a network 900 as illustrated in FIG. 9.

Referring to FIG. 8, the first transmission mode allows for direct communication between different participants in a given geographic location. As illustrated, a vehicle can have a communication with an individual (V2P) through a PC5 interface. Communications between a vehicle and another vehicle (V2V) may also occur through a PC5 interface. In a like manner, communication may occur from a vehicle to other highway components, such as a signal (V21) through a PC5 interface. In each embodiment illustrated, two-way communication can take place between elements, therefore each element may be a transmitter and a receiver of information. In the configuration provided, the first transmission mode is a self-managed system and no network assistance is provided. Such transmission modes provide for reduced cost and increased reliability as network service interruptions do not occur during handover operations for moving vehicles. Resource assignments do not need coordination between operators and subscription to a network is not necessary, therefore there is reduced complexity for such self-managed systems.

The V2X system is configured to work in a 5.9 GHz spectrum, thus any vehicle with an equipped system may access this common frequency and share information. Such harmonized/common spectrum operations allows for safe operation. V2X operations may also co-exist with 802.11p operations by being placed on different channels, thus existing 802.11p operations will not be disturbed by the introduction of V2X systems. In one non-limiting embodiment, the V2X system may be operated in a 10 MHz band that describes/contains basic safety services. In other non-limiting embodiments, the V2X system may be operated over a wider frequency band of 70 MHz to support advanced safety services in addition to basic safety services described above.

Referring to FIG. 9, a second of two complementary transmission modes is illustrated. In the illustrated embodiment, a vehicle may communicate to another vehicle through network communications. These network communications may occur through discrete nodes, such as eNodeB, that send and receive information between vehicles. The network communications may be used, for example, for long range communications between vehicles, such as noting the presence of an accident approximately 1 mile ahead. Other types of communication may be sent by the node to vehicles, such as traffic flow conditions, road hazard warnings, environmental/weather reports, service station availability and other like data. Data can be obtained from cloud-based sharing services.

For network communications, residential service units (RSUs) may be utilized as well as 4G/5G small cell communication technologies to benefit in more highly covered areas to allow real time information to be shared among V2X users. As the number of RSUs diminishes, the V2X systems may rely more on small cell communications, as necessary.

In either of the two complementary transmission modes, higher layers may be leveraged to tune congestion control parameters. In high density vehicle deployment areas, using higher layers for such functions provides an enhanced performance on lower layers due to congestion control for PHY/MAC.

The vehicle systems that use V2X technologies have significant advantages over 802.11p technologies. Conventional 802.11p technologies have limited scaling capabilities and access control can be problematic. In V2X technologies, two vehicles apart from one another may use the same resource without incident as there are no denied access requests. V2X technologies also have advantages over 802.11p technologies as these V2X technologies are designed to meet latency requirements, even for moving vehicles, thus allowing for scheduling and access to resources in a timely manner.

In the instance of a blind curve scenario, road conditions may play an integral part in decision making opportunities for vehicles. V2X communications can provide for significant safety of operators where stopping distance estimations may be performed on a vehicle by vehicle basis. These stopping distance estimations allow for traffic to flow around courses, such as a blind curve, with greater vehicle safety, while maximizing the travel speed and efficiency.

Example Vehicle to Everything (V2X) Radio Access Technology (RAT) Feature Negotiation and Control Rel-14 cellular vehicle to everything (CV2X) over a PC5 interface is the baseline design that is based on long-term evolution (LTE) radio access technology (RAT). Rel-15 CV2X over PC5 interface enhanced the baseline design, but has additional features such as 64 quadrature amplitude modulation (QAM), carrier aggregation (CA), and transmit diversity (TxD). These features may not be backward compatible. For example a Release-14 UE may not be able to decode messages transmitted using features that may be supported by some Rel-15 UEs. Moreover, not all features are supported by Rel-15 UEs. However, a Rel-15 UE may be able to decode Rel-14 messages. Rel-16 CV2X messages over PC5 interface may be based on NR RAT (besides LTE RAT) design. A Rel-16 UE may support Rel-15 LTE RAT and Rel-16 NR RAT.

If a UE selects a RAT option that is not supported by other neighboring UEs (e.g., UEs within V2X communication range), messages from the UE may not be properly received/decoded by the other UEs, causing CV2X operation issues. For example, if a safety message is sent using Rel-15 communication features, the message cannot be decoded by Rel-14 UEs, which may cause accidents. If a Rel-15 UE sends a message using CA with 3 component carriers (CCs), while other UEs around only support 2 CCs, the message may not be decoded by the other UEs, even if these UEs supports other Rel-15 communication features.

On the other hand, selection of a legacy format for a message unnecessarily wastes system resources, and potentially causes channel congestion. For example, if a Rel-15 UE uses Rel-14 format when all UEs around are Rel-15, or if a Rel-15 UE uses 16 QAM, while all UEs around supports 64 QAM, the V2X spectrum is not efficiently utilized.

Thus, what is needed is neighbor aware feature selection techniques that allow packet transmissions to reach other UEs and be decoded properly. For example, some transmissions may be used for safety, and thus, it is important for these transmissions to reach as many UEs as possible. Therefore, the feature selection techniques in accordance with aspects of the present disclosure may allow for Rel-15 UEs to know when to use Rel-14 format, and Rel-15 UEs to know when to use Rel-15 communication features.

Figure 10:
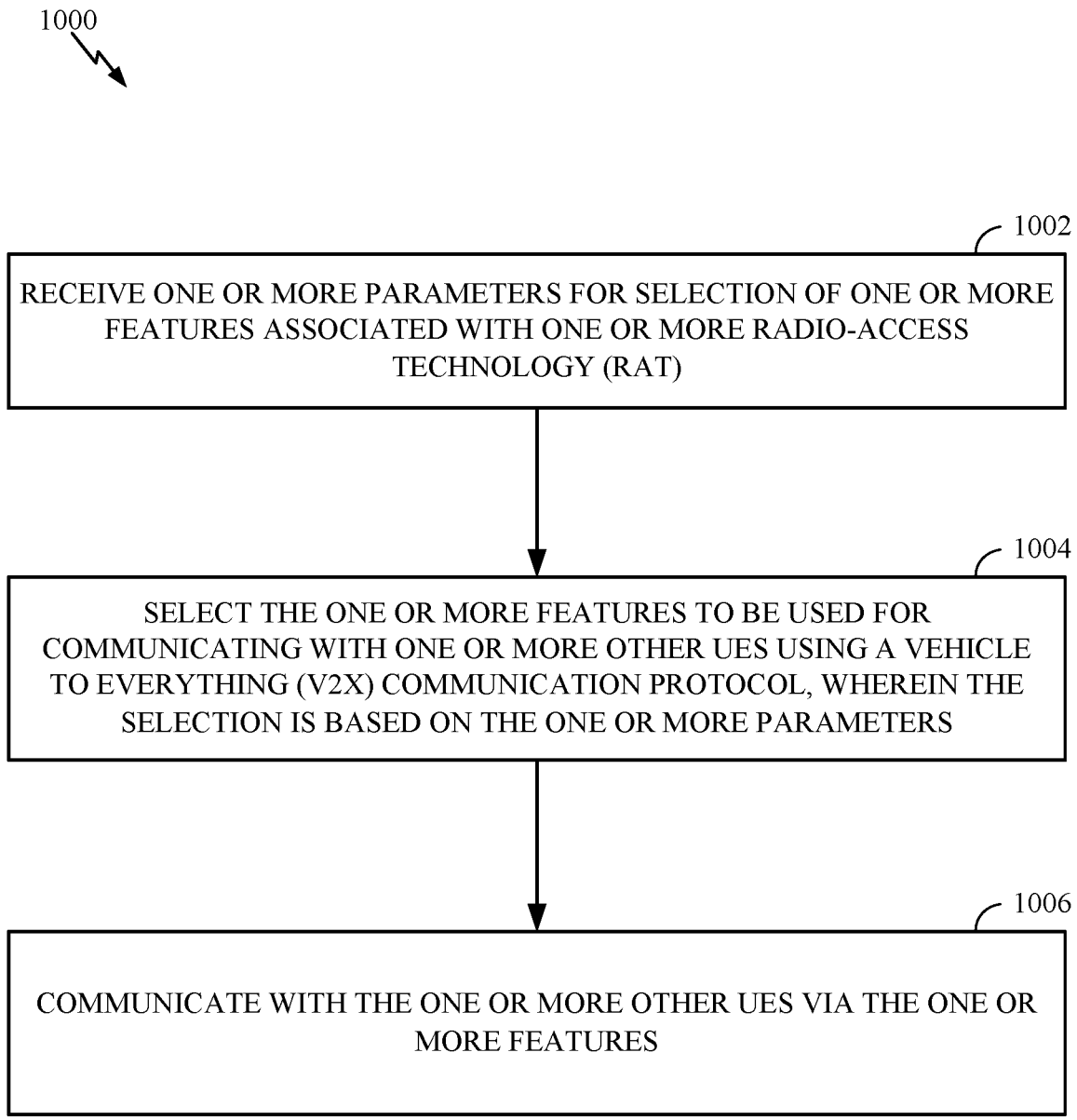
FIG. 10 illustrated example operations for wireless communication, in accordance with aspects of the present disclosure.

FIG. 10 illustrated example operations 1000 for wireless communication, in accordance with aspects of the present disclosure. For example, operations 1000 may be performed by a UE (e.g., UE 12), which may be, for example, a vehicle equipped with a V2X communication system (or any device that enables V2X communications).

Operations 1000 begin, at block 1002, by receiving (e.g., via the reception component 1401 and/or processor 1404) one or more parameters for selection of one or more features associated with one or more RATs. In certain aspects, the receiving at block 1002 may include receiving a packet from an application layer of the UE including the one or more parameters. The operations 1000 continue, at block 1004, by selecting (e.g., via the selection component 1408) the one or more feature to be used for communicating with one or more other UEs using a vehicle to everything (V2X) communication protocol. The selection may be based on the one or more parameters received at block 1002. The selection described with respect to block 1002 may include selecting features associated with a RAT, or selecting one of a plurality of RATs for communication. In certain aspects, the operations 1000 also include, at block 1006, communicating (e.g., via the transceiver 1411) with the one or more other UEs via the selected one or more features.

Certain aspects of the present disclosure provide a static policy based RAT option selection technique. For example, the receiving, at block 1002, may include receiving a packet from an application layer of the UE, the packet including the one or more parameters. For example, the application layer may generate a packet and send the packet to the V2X layer. The packet may include a provider service identifier (PSID) (e.g., via application programing interface (API) parameter). PSID is an identifier that is associated with a service being provided using a communications system. Based on a configuration available on the UE, the V2X layer may derive parameters (e.g., for the selection of features or RATs) based the received PSID. The PSID is either passed from the application layer via API, or derived by the V2X layer based on application association.

Such configuration could be static or semi-statically preset on the UE, or be dynamically provisioned, or signaled to the UE from network.

FIG. 11 is a table 1100 illustrating an example mapping between PSIDs and communication options, in accordance with certain aspects of the present disclosure. As illustrated, each PSID may be mapped (e.g., via a mapping component 1405) to a communication option (e.g., RAT, carrier frequency set, modulation scheme). In some cases, each packet of a PSID may be associated with a priority rating (e.g., ProSe Per Packet Priority (PPPP)), which may also be taken into consideration when determining the communication option. The V2X layer may be configured with the information in table 1100. The V2X layer passes the derived RAT option parameters (e.g., RAT to use, carrier frequency set, and other features such as modulation scheme and whether TxD is used) to the access stratum (AS) layer with the packet to be used for the communication to the other UEs. The V2X layer can be pre-configured, provisioned, or updated by a network to include the configuration provided in table 1100 for selection of the RAT and other features for communication.

Other than PSID, a type of the packet (e.g., whether the packet is an internet protocol (IP) or non-IP type packet) received from the application layer may be considered in order to select the communication option to use. For example, receiving the one or more parameters as described in block 1002 may include receiving a packet from an application layer of the UE, the packet being the one or more parameters. In certain aspects, lower level features (e.g., such as 64 QAM, and whether TxD is to be used) may be concealed from the V2X layer, as these features are not specific to any particular RAT. In such a case, the aforementioned RAT option parameters are stored in a configuration container that is not processed by the V2X layer. The V2X layer only passes the configuration container down to the AS layer together with the packet. In some cases, a PSID may correspond to two different RATs depending on PPPP. For example, some messages may be sent over a release-14 RAT and some messages may be sent over a release-15 RAT depending on the PPPP associated with the message. In this case, the RAT may be left for the AS layer to select based on lower layer sensing or determination.

Certain aspects of the present disclosure provide a bearer-based policy for the selection of the communication option. In this case, the mapping to the RAT and/or other communication features may be based on virtual V2X bearers. When a V2X application is activated, based on its requirements, e.g. QoS requirements (bit rate, delay bound, priority, etc.), a V2X bearer is generated, and the associated bearer filter and corresponding RAT option parameters are also created. For example, the application layer may generate a packet and send the packet to the V2X layer including the PSID (via API parameter). The V2X layer may, based on configured V2X bearer filters, decide the bearer associated with the packet. In certain aspects, the mapping of the packet to the bearer may performed by the mapping component 1405. The bearer may be associated with quality of service (QoS) parameters and the corresponding lower layer parameters (e.g., RAT option parameters). The V2X layer performs the filtering of the packet passed from application layer based on at least one of the PSID, a PPPP associated with the packet, and whether the packet is an IP packet or not.

FIG. 12 is table 1200 illustrating example bearer binding information, in accordance with certain aspects of the present disclosure. The bearer binding information maps each bearer to a communication option, as illustrated. The V2X layer may have the bearer binding information, which are then provided to and used by lower layers to operate the corresponding RAT for communication. In certain aspects, the bearer binding parameters may be selected when the bearers are first created or updated. The bearer filter can be created by the UE, could be pre-configured, or passed down from the network.

In certain aspects, management of the bearer filter may be consistent across all UEs. The selection of the parameters for the bearer may also be consistent and may be standardized across all UEs.

Certain aspects of the present disclosure provide techniques for performing a bearer-based RAT selection at an upper layer (e.g., application layer) and dynamic feature selection at a lower layer of the UE. For example, at the V2X layer, the RAT (e.g. Rel-14 or Rel-15) may be selected for the communication, and the RAT specific feature options are then selected at a lower layer, allowing for a stable upper layer design.

FIG. 13 is a table 1300 illustrating example binding information that may be used by an upper layer of a UE, in accordance with certain aspects of the present disclosure. As illustrated, the upper layer (e.g., V2X layer) may select the RAT, carrier frequency set and respective priorities of carriers within the set. The lower layer communication feature options are then selected for the RAT selected by the V2X layer. In some cases, the selection of the features may be UE implementation specific (e.g., not standardized).

In some cases, UEs may broadcast their respective capabilities (e.g., RAT communication options) at a certain periodicity. UEs can therefore gauge the fraction of UEs that support certain RATs and the associated features/communication options to decide which RAT and/or communication features to use for communication. For example, a UE may determine (e.g., via the processor 1404) that 34% of the UEs in the area support the Rel-14 RAT, 16% of the UEs support the Rel-15 RAT with 64 QAM modulation scheme, an 8% of the UEs support the Rel-15 RAT with TxD, and may determine the corresponding RAT and communication features to use accordingly.

In some cases, the capability information may be broadcast (e.g., via the transceiver 1411) by the UEs using normal V2X messages and may be included in every V2X message. In this case, UEs may include the capability information as a part of the V2X message if the capability information does not impact backwards compatible reception. For example, the UE may include the capability information in a V2X message if Rel-14 UEs can decode (e.g., via the decoding component 1410) such messages by ignoring the additional capability information.

In another alternative, the UE may transmit the capability information in an information element (IE) using other types of messages. The other type of messages may be transmitted at a low periodicity to reduce congestion that may be caused by the transmissions. In some cases, the periodicity of transmitting such capability information may be configured by RRC. In some cases, the existence of legacy UEs (e.g. a Rel-14 UE) may be detected if a message is received from the UE which does not include such IEs having capability information.

The IEs having capability information may be sent using a control message (e.g., as part of scheduling assignment (SA)), using a MAC control element (CE), a V2X layer header, or a PC5 RRC message. If the capability information cannot be embedded as a part of an existing message protocol without maintaining backwards compatible reception, then separate messages containing this information may be sent instead. Receiver UEs may associate the MAC Layer 2 identifier (ID) of the received message with the received feature capability list, allowing for the determination of the fraction of neighboring UEs that support a particular RAT and communication features.

In some cases, the sender of the capability information can also transmit the UEs own perceived fraction of the number of UEs that support a certain RAT and/or communication features, enabling consensus based decision on what the neighbor UEs are capable of. The UEs may use the mixture of their own perception and the received aggregated perception to make a decision to enable or disable a transmission or select the RAT and/or features for communication.

In certain aspects, RRC configuration may be used to enable use of a certain feature. For example, usage of 64 QAM modulation scheme for transmission may be permitted only if the percentage of neighboring UEs estimated to support this feature is greater than a threshold. This threshold may be RRC configured.

In certain aspects, the dynamic feature selection may be performed based on capability information received from the upper layer of the UE. For example, the capability information transmitted by each UE, and used by receiving UEs to determine the communication feature, may be transmitted in a container as part of an upper layer message (e.g., a V2X basic safety message (BSM) or common awareness message (CAM)/decentralized notification messages (DENM) message). The upper layer of the UE that receives the message may not be able to process the capability information, but the upper layer of the receiving UE may decode (e.g., via the decoding component 1410) the message and provide the container to the lower layer of the UE for processing (e.g., determining the fraction of UEs that support each feature and selection of the communication features).

Certain aspects of the present disclosure provide a PC5 RRC messaging based RAT configuration. RRC messages may be sent over PC5 interface as described with respect to FIG. 8. The RRC message can be sent using the PC5 packet data convergence protocol (PDCP) layer which indicates that it is a RRC protocol data unit (PDU) type, or a PC5 signaling protocol PDU type. In case of latter, the PC5 signaling protocol header will provide information to indicate that the message is RRC signaling. For example, each UE may periodically transmit (broadcast) its own capability information using the PC5 interface (e.g., if the UE is also transmitting PC5 user plane messages). The periodicity of the transmissions may be preconfigured in some cases. A receiver UE then binds the capability information with the identifier (e.g., L2 ID) of the transmitting UE.

The receiving UE may additionally send its capability report of what the neighboring UEs around it support and what optional features can be enabled/disabled. The UE may use its own report and the received aggregated report from other UEs to decide (self-configure/de-configure) a feature for communication. The information that may be communicated using the PC5 interface may include a supported feature of the UE, CA support (e.g., band combinations for CA), current frequencies the UE is tuned to for reception and transmission, the current application running on the UE, or any combination thereof.

Certain aspects of the present disclosure provide scenarios to limit TxD usage. For example, whether TxD is enabled may be based on one or more factors. These factors may include whether a channel busy ratio (CBR) parameter is above a threshold, the fraction of the number of UEs using a specific RAT (e.g., Rel-14 vs Rel. 15), and the priority of the service (e.g., priority corresponding to the PSID) being provided. These factors may also include the fraction of UEs supporting a specific RAT (e.g., Rel-14) with a reference signals received power (RSRP) parameter exceeding a certain threshold.

Certain aspects of the present disclosure provide criteria for the UE to select the communication features and parameters, e.g. CA, carrier frequency set, 64-QAM, TxD, etc., based on the PSID, CBR of a carrier frequency, vehicle/UE speed, PPPP, support of a communication features by surrounding UEs, or any combination thereof. Such criteria for the selection can be pre-configured on the UE, provisioned, or dynamically signaled to the UE by the network.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, means for receiving may comprise, for example, the reception component 1401 and/or a transceiver such as the transceiver 1411. Means for selecting may comprise, for example, the selection component 1408 and/or processor 1404. Means for communicating may comprise a transceiver, such as the transceiver 1411. Means for determining and means for processing may comprise a processor, such as the processor 1404. Means for mapping may comprise a processor such as the processor 1404 and/or the mapping component 1405. Means for decoding may comprise a processor such as the processor 1404 and/or the decoding component 1410.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user-equipment (UE), comprising:
   receiving one or more parameters for selection of one or more features associated with one or more radio-access technologies (RATs);
   determining whether at least one UE supports the one or more features, the at least one UE being within vehicle to everything (V2X) communication range of the UE;
   selecting the one or more features to be used for communicating with one or more other UEs using a vehicle to everything (V2X) communication protocol, wherein the selection is based on the one or more parameters, and further based on the determination of the support by the at least one UE, and wherein the selection of the one or more features comprises selecting features associated with a RAT or selecting a RAT of the one or more RATs to be used for the communication based on the one or more parameters; and
   communicating with the one or more other UEs via the selected one or more features.

2. The method of claim 1, wherein a criteria for the selection of the one or more features is preconfigured at the UE, dynamically provisioned, or signaled to the UE from a network entity.

3. The method of claim 1, wherein the one or more features comprise at least one of a carrier frequency set for carrier aggregation, a modulation scheme, or whether transmit diversity is to be used for the communication.

4. The method of claim 1, further comprising:
   receiving capability information from each of the at least one UE that are within the V2X communication range, wherein the determination of whether the at least one UE supports the one or more features is based on the capability information.

5. The method of claim 4, wherein the capability information is received as part of a control message, a media access control (MAC) control element (CE), a V2X layer header, or a PC5 interface radio resource control (RRC) message.

6. The method of claim 4, wherein the capability information is received, at an upper layer of the UE, as part of a container in an upper layer message, the method further comprising:
  decoding the container at the upper layer; and
  providing the container to a lower layer of the UE; and
  processing, at the lower layer, the capability information included in the container.

7. The method of claim 1, further comprising transmitting an indication of the support by the at least one UE.

8. The method of claim 1, further comprising:
  receiving an indication of whether the at least one UE that is within V2X communication range support the one or more features, wherein the selection of the one or more features is further based on the received indication.

9. The method of claim 1, wherein the one or more parameters comprise a provider service identifier (PSID) associated with the communication.

10. The method of claim 1, wherein receiving the one or more parameters comprises receiving a packet from an application layer of the UE, the packet comprising the one or more parameters.

11. The method of claim 10, wherein the selection of the one or more features is based on a type of the received packet.

12. The method of claim 11, wherein the one or more parameters further comprise an indication of a priority of the packet.

13. The method of claim 11, further comprising:
  mapping the packet to a bearer of a plurality of bearers based on the one or more parameters, wherein:
    each of the plurality of bearers is associated with a feature corresponding to the one or more RATs; and
    the selection of the one or more features is based on the bearer to which the packet is mapped.

14. The method of claim 1, further comprising transmitting capability information associated with the UE.

15. The method of claim 14, wherein the capability information is transmitted as part of a V2X message.

16. The method of claim 15, wherein the capability information is transmitted at a periodic rate, the periodic rate being radio-resource control (RRC) configured.

17. The method of claim 14, wherein the capability information is transmitted as part of a control message, a media access control (MAC) control element (CE), a V2X layer header, or a PC5 interface RRC message.

18. The method of claim 14, wherein the capability information is transmitted as part of an upper layer message.

19. An apparatus for wireless communication, comprising:
  a transceiver configured to receive one or more parameters for selection of one or more features associated with one or more radio-access technologies (RATs); and
  a processing system configured to:
    determine whether at least one UE supports the one or more features, the at least one UE being within vehicle to everything (V2X) communication range of the UE;
    select the one or more features to be used for communicating with one or more other UEs using a vehicle to everything (V2X) communication protocol, wherein the selection is based on the one or more parameters, and further based on the determination of the support by the at least one UE, wherein the transceiver is configured to communicate with the one or more other UEs via the selected one or more features, and wherein the selection of the one or more features comprises selecting features associated with a RAT or selecting a RAT of the one or more RATs to be used for the communication based on the one or more parameters.

20. A non-transitory computer readable medium having instructions stored thereon for:
  receiving, one or more parameters for selection of one or more features associated with one or more radio-access technologies (RATs);
  determining whether at least one UE supports the one or more features, the at least one UE being within vehicle to everything (V2X) communication range of the UE;
  selecting the one or more features to be used for communicating with one or more UEs using a vehicle to everything (V2X) communication protocol, wherein the selection is based on the one or more parameters, and further based on the determination of the support by the at least one UE, and wherein the selection of the one or more features comprises selecting features associated with a RAT or selecting a RAT of the one or more RATs to be used for the communication based on the one or more parameters; and
  communicating with the one or more UEs via the selected one or more features.

21. An apparatus for wireless communication, comprising:
  means for receiving, at a first UE that supports a first format, one or more parameters for selection of one or more features associated with one or more radio-access technology (RATs);
  means for determining whether at least one UE supports the one or more features, the at least one UE being within vehicle to everything (V2X) communication range of the UE;
  means for selecting the one or more features to be used for communicating with one or more UEs using a vehicle to everything (V2X) communication protocol, wherein the means for selecting the one or more features is based on the one or more parameters, and further based on the determination of the support by the at least one UE, and wherein the selection of the one or more features comprises selecting features associated with a RAT or selecting a RAT of the one or more RATs to be used for the communication based on the one or more parameters; and
  means for communicating with the one or more UEs via the selected one or more features.

* * * * *